(12) United States Patent
Koszewnik

(10) Patent No.: US 10,329,996 B2
(45) Date of Patent: Jun. 25, 2019

(54) HYBRID OPPOSED-PISTON ENGINE SYSTEM

(71) Applicant: ACHATES POWER, INC., San Diego, CA (US)

(72) Inventor: John J. Koszewnik, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 86 days.

(21) Appl. No.: 15/830,972

(22) Filed: Dec. 4, 2017

(65) Prior Publication Data

US 2018/0087445 A1    Mar. 29, 2018

Related U.S. Application Data

(62) Division of application No. 15/042,422, filed on Feb. 12, 2016, now Pat. No. 9,915,188.

(60) Provisional application No. 62/126,163, filed on Feb. 27, 2015.

(51) Int. Cl.
| | | |
|---|---|---|
| *F02B 25/08* | (2006.01) | |
| *F02B 11/02* | (2006.01) | |
| *F02B 75/28* | (2006.01) | |
| *F02B 21/00* | (2006.01) | |
| *B60K 6/12* | (2006.01) | |
| *F02B 29/00* | (2006.01) | |

(Continued)

(52) U.S. Cl.
CPC ............. *F02B 11/02* (2013.01); *B60K 6/12* (2013.01); *F01B 7/14* (2013.01); *F02B 21/00* (2013.01); *F02B 29/00* (2013.01); *F02B 75/282* (2013.01); *F04B 3/00* (2013.01); *Y02T 10/146* (2013.01)

(58) Field of Classification Search
CPC .......... F02B 11/02; F02B 29/00; F02B 21/00; F02B 75/282; F01B 7/14; F04B 3/00; Y02T 10/146
See application file for complete search history.

(56) References Cited

U.S. PATENT DOCUMENTS

| | | | |
|---|---|---|---|
| 1,683,040 A | 9/1928 | Junkers | 123/27 R |
| 2,031,318 A | 2/1936 | Junkers | 123/51 BA |
| 4,308,720 A | 1/1982 | Brandstadter | 123/46 R |

(Continued)

OTHER PUBLICATIONS

Notice of Allowance dated Jan. 22, 2018 for U.S. Appl. No. 15/042,422.

(Continued)

*Primary Examiner* — Marguerite J McMahon
(74) *Attorney, Agent, or Firm* — Terrance A. Meador; Julie J. Muyco

(57) ABSTRACT

An opposed-piston engine system equipped for full hybrid compressed-air/combustion includes capacity for storing air compressed by the engine during a combustion mode of operation. The hybrid opposed-piston engine system includes a control mechanization for operating the opposed-piston engine in a combustion mode by provision of fuel, in a compressed-air mode by provision of stored compressed air, and in a combustion mode supplemented by provision of stored compressed air. A method of operating a hybrid vehicle equipped with an opposed-piston engine includes storing air compressed by the engine during a combustion mode of operation and operating in the vehicle a compressed-air mode by provision of stored compressed air.

7 Claims, 2 Drawing Sheets

(51) Int. Cl.
*F04B 3/00* (2006.01)
*F01B 7/14* (2006.01)

(56) References Cited

U.S. PATENT DOCUMENTS

| | | | |
|---|---|---|---|
| 5,058,537 A | 10/1991 | Paul et al. | 123/193.6 |
| 6,182,619 B1 | 2/2001 | Spitzer et al. | 123/51 B |
| 8,485,161 B2 | 7/2013 | Lemke | 123/481 |
| 8,539,918 B2 | 9/2013 | Lemke et al. | 123/52.2 |
| 8,746,190 B2 | 6/2014 | Lemke et al. | 123/51 B |
| 8,919,304 B2 | 12/2014 | Fuqua et al. | 123/51 B |
| 8,997,712 B2 | 4/2015 | Fuqua et al. | 123/51 B |
| 2007/0089694 A1 | 4/2007 | Hacsi | 123/48 D |
| 2012/0055451 A1 | 3/2012 | Jorda | 123/51 R |
| 2012/0125298 A1* | 5/2012 | Lemke | F01B 7/14 123/51 B |
| 2016/0252004 A1 | 9/2016 | Koszewnik | 123/51 B |

OTHER PUBLICATIONS

"Hybrid Air an innovative petrol full-hybrid solution", PSA Peugeot Citroen Press Release Jan. 22, 2013.
Higelin, P., Charlet, A., and Chamaillard, Y., "Thermodynamic Simulation of a Hybrid Pneumatic-Combustion Engine Concept", Int. J. of Applied Thermodynamics, 5(N1), 1-11, 2002.
Dönitz, C., Vasile, I., Onder, C., and Guzzella, L., "Realizing a Concept for High Efficiency and Excellent Driveability: The Downsized and Supercharged Hybrid Pneumatic Engine", SAE Technical Paper 2009-01-1326, 2009.

\* cited by examiner

HYBRID OPPOSED-PISTON ENGINE SYSTEM

PRIORITY

This application is a divisional application of U.S. patent application Ser. No. 15/042,422, filed Feb. 12, 2016, titled "Hybrid Opposed-Piston Engine System," which in turn claims priority to U.S. Provisional Application Ser. No. 62/126,163, filed Feb. 27, 2015, titled "Hybrid Opposed-Piston Engine System."

This application contains subject matter related to the subject matter of: U.S. patent application Ser. No. 13/373,448, filed Nov. 14, 2011, now U.S. Pat. No. 8,746,190 B2; U.S. patent application Ser. No. 13/385,510, filed Feb. 21, 2012, now U.S. Pat. No. 8,919,304 B2; and U.S. patent application Ser. No. 14/550,813, filed Nov. 21, 2014, now U.S. Pat. No. 8,997,712.

FIELD

The field is hybrid opposed-piston internal combustion engine systems. More specifically, the field covers hybrid opposed-piston internal combustion engine systems that provide motive power for vehicles.

BACKGROUND

When compared with four-stroke engines, ported, two-stroke, opposed-piston internal combustion engines have acknowledged advantages of specific output, power density, and power-to-weight ratio. For these and other reasons, after almost a century of limited use, increasing attention is being given to the utilization of opposed-piston engines for motive power in a wide variety of modern vehicles.

Per FIG. 1 an opposed-piston, two-stroke engine 8 includes at least one cylinder 10 with a bore 12 and longitudinally displaced intake and exhaust ports 14 and 16 machined or formed in the cylinder, near respective ends thereof. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1. Fuel injection nozzles 17 are secured in threaded holes that open through the sidewall of the cylinder. Two pistons 20, 22 are disposed in the bore 12 with their end surfaces 20e, 22e in opposition to each other. For convenience, the piston 20 is referred to as the "intake" piston because of its proximity to the intake port 14. Similarly, the piston 22 is referred to as the "exhaust" piston because of its proximity to the exhaust port 16. Preferably, but not necessarily, the intake piston 20 and all other intake pistons are coupled to a crankshaft 30 disposed along one side of the engine 8, and the exhaust piston 22 and all other exhaust pistons are coupled to a crankshaft 32 disposed along the opposite side of the engine 8. A gear train (not shown) couples the crankshafts and includes an output shaft that provides motive power to drive a vehicle. Other representative opposed-piston engine constructions are described in U.S. Pat. Nos. 1,683,040; 2,031,318; 8,485,161 B2; and U.S. Pat. No. 8,539,918 B2.

During operation of a two-stroke, opposed-piston engine, such as the engine 8 of FIG. 1, pairs of pistons move in opposition in the bores of ported cylinders such as the cylinder 10. In a compression stroke, as two opposed pistons move toward each other in a cylinder bore, a combustion chamber is formed in the bore, between the end surfaces of the pistons. Fuel is injected directly into the volume of the combustion chamber when the pistons are at or near respective top center ("TC") locations in the bore. The fuel is injected through fuel injector nozzles mounted on the sidewall of the cylinder. The fuel mixes with air admitted into the bore. As the air-fuel mixture is compressed between the piston end surfaces, the compressed air reaches a temperature that causes the fuel to ignite. Combustion follows. Combustion timing is frequently referenced to "minimum volume" of the combustion chamber, which occurs when the piston end surfaces are in closest mutual proximity. In some instances injection occurs at or near minimum volume; in other instances, injection may occur before minimum volume. In any case, in response to combustion the pistons reverse direction and undergo a power stroke. During the power stroke, the pistons move away from each other toward bottom center ("BC") locations in the bore. As the pistons reciprocate between top and bottom center locations they open and close ports formed in respective intake and exhaust locations of the cylinder in timed sequences that control the flow of air into, and exhaust from, the cylinder.

The related applications describe recent improvements to opposed-piston engines which incorporate compression-release functionality into construction and operation of the engines. In this regard, compression release functionality involves the release of compressed air from a cylinder other than through its exhaust port and in the absence of combustion. One example is compression-release braking. Compression-release braking is a particularly useful feature for vehicles such as medium-duty and heavy-duty trucks because it uses engine operations to slow vehicle speed instead of (or in addition to) friction brakes. The designs for compression-release braking for opposed-piston engines involve the exhaustion of compressed air from between the piston end surfaces while fuel injection is suppressed. Work performed in transporting and compressing the air is not returned to the crankshafts, thereby slowing the engine, which slows the vehicle. The compressed air is released by way of a valve acting through the side of the cylinder at a location between the intake and exhaust ports of the cylinder. As taught in U.S. Pat. No. 8,746,190 B1, the released compressed air can be stored in an accumulator and released therefrom to supplement work performed by various engine components during normal engine operation.

As the designs for opposed-piston internal combustion engines advance and lead to improved performance with engine configurations, the returns of investment will begin to diminish. It is therefore useful and desirable to consider hybridization of opposed-piston engine systems by incorporation of stored energy that can be activated during engine operation to supplement the work enabled by internal combustion alone, which will introduce a new factor to increase the engine's efficiency. The rewards of such hybridization would be increased to the extent that the stored energy could be replenished by the engine during operation.

One hybrid engine system that has been proposed for vehicle use may be described as an air/gasoline hybrid in which compressed air is generated and stored during unassisted gasoline operation and then released to assist gasoline operation of the engine or to power the engine solely with air. (Hybrid Air An innovative petrol full-hybrid solution PSA PEUGEOT CITROEN Press Release Jan. 22, 2013). It would be beneficial in terms of improved performance to consider the hybridization of opposed-piston engine systems by combining pneumatic and combustion capabilities to power the engines.

The compression-release braking constructions and the air storage and release capability described in related U.S. Pat. No. 8,746,190 B1 are combined to enable valve-controlled operation for transporting stored compressed air from an accumulator into a channel through which air is provided to the intake ports of the opposed-piston engine. The provision of compressed air may, for example, supplement work performed by a supercharger during normal combustion operation, thereby improving fuel consumption. This engine system performs as a mild hybrid with two modes of operation: combined compressed-air/combustion and combustion alone. However, without the capability of operating the engine in a compressed-air-only mode, the full hybrid potential is unrealized.

SUMMARY

In the mild hybrid opposed-piston engine system configuration, a compressed-air storage device receives compressed air from the cylinder through a unidirectional channel controlled by a compression release valve. According to this disclosure, the full hybrid potential for a compressed-air/combustion opposed-piston engine system is realized by provision of a valve-controlled bidirectional channel between the compressed-air storage device and the cylinder that supports bidirectional transport of compressed air to and from the cylinder by way of the compression release valve.

Another valve-controlled channel allows for transport of compressed air from the air storage device to the engine's charge air channel, which, together with the bidirectional transport channel between the compressed-air storage device and the cylinder, underpins a full hybrid capability for the opposed-piston engine.

In some aspects, another valve-controlled channel may be provided to provide transport of compressed air from the cylinder for compression-release engine braking.

DETAILED DESCRIPTION OF THE PREFERRED EMBODIMENTS

The hybrid opposed-piston engine system described in this specification is presented in an explanatory context that includes a two-stroke, fuel-injected opposed-piston engine having at least one cylinder with a bore in which a pair of pistons is disposed with their end surfaces in opposition. This example is not intended to limit the opposed-piston engine in any way. Thus, a hybrid opposed-piston engine system is not limited to any specific number of crankshafts. For example, the engine may comprise one crankshaft, two crankshafts, or three or more crankshafts. In other aspects, the hybrid opposed-piston engine may comprise one, two, three, or more ported cylinders, each with a bore, piston-controlled exhaust and intake ports, and a pair of opposed pistons disposed in the bore.

In this specification the oxygen-bearing gas mixture provided to mix with fuel in order to enable combustion in an opposed-piston engine is referred to as "air", and this term is intended to include fresh air and/or charge air. In some instances, the air may include an admixture of exhaust products; otherwise, it may not.

Figure 2:
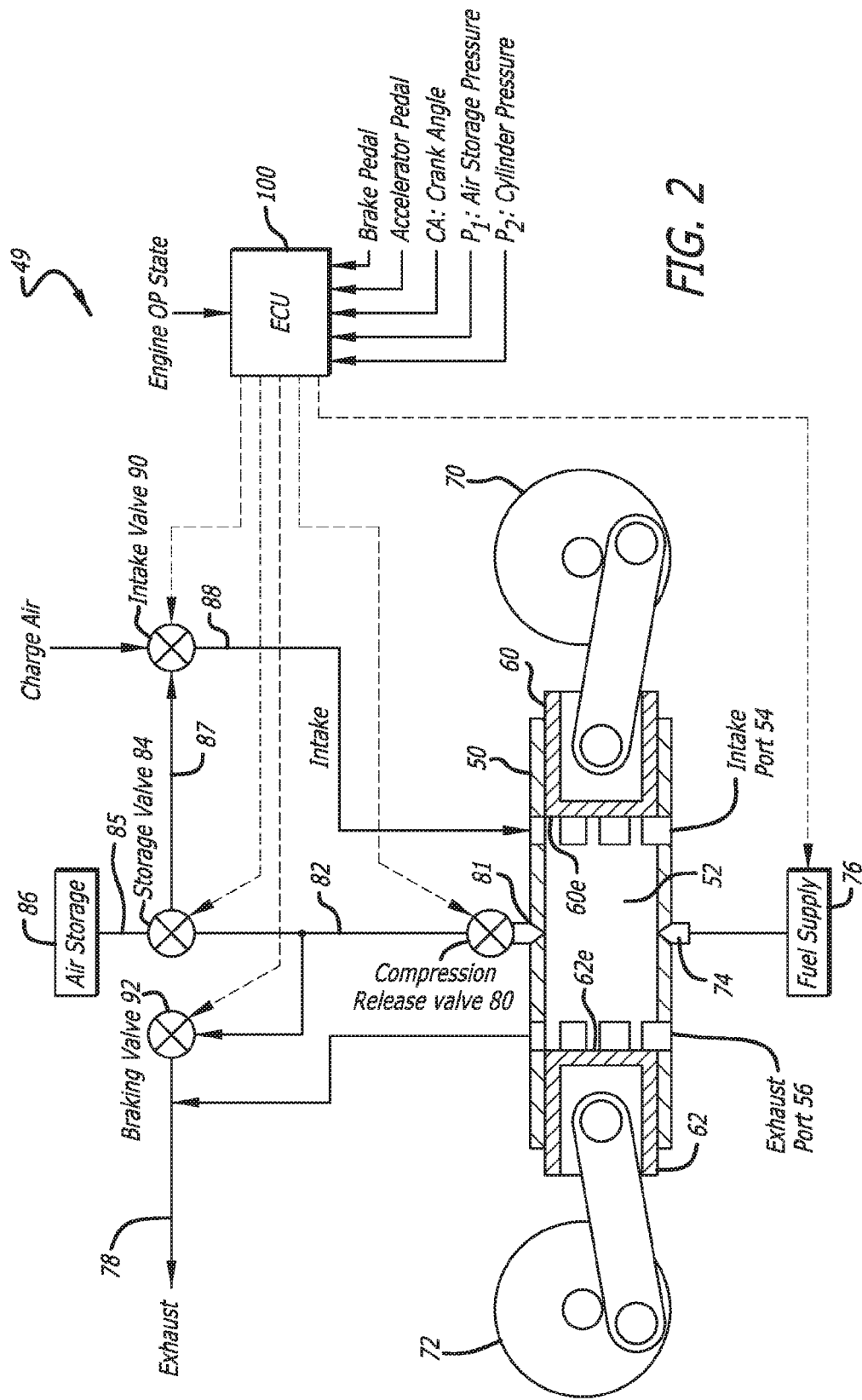
FIG. 2 is a schematic illustration of a hybrid opposed-piston engine system according to this disclosure.

In FIG. 2, a hybrid opposed-piston engine system which may be used for powering a vehicle includes an opposed-piston engine 49 having one or more cylinders 50. Each cylinder 50 has a bore 52 and intake and exhaust ports 54 and 56 formed or machined in respective ends of the cylinder. Intake and exhaust pistons 60 and 62 are slidably disposed in the bore 52 with their end surfaces 60e and 62e opposing one another. When the pistons 60 and 62 are at or near their TC positions, a combustion chamber is defined by the bore 52 and the end surfaces of the pistons. The intake piston 60 and all other intake pistons are coupled to a crankshaft 70 disposed along one side of the engine 49, and the exhaust piston 62 and all other exhaust pistons are coupled to a crankshaft 72 disposed along the opposite side of the engine. Fuel is injected directly into the combustion chamber, between the piston end surfaces 60e and 62e, through at least one fuel injector nozzle 74 mounted in an opening through the side of the cylinder 50; preferably, a second fuel injector (not seen) is mounted to an opening in the cylinder opposite the opening in which the injector 74 is mounted. A fuel supply 76 comprising a reservoir, a pump or pumps, and a common rail or rails supplies fuel to the injectors of the engine.

Figure 1:
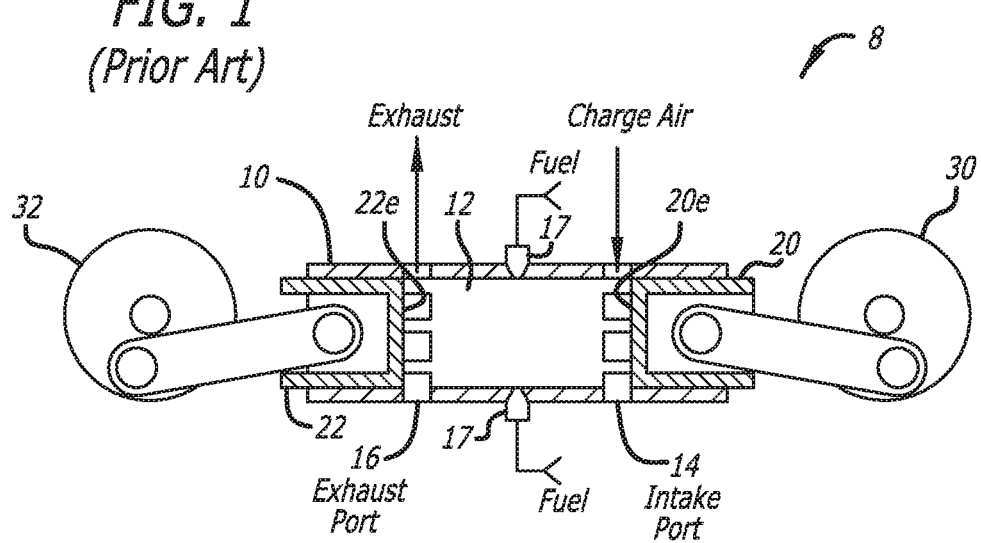
FIG. 1 is a schematic illustration of an opposed-piston engine of the prior art.

The engine 49 operates in a combustion mode as per the description of the engine illustrated in FIG. 1. In this regard, air is transported through a charge air channel 88 of the engine to the intake port 54 when the pistons 60 and 62 are near BC. The air flows through the intake port 54 into the bore 52 of the cylinder. As rotation of the crankshafts 70 and 72 drives the pistons into the bore, the air is compressed into the space of the combustion chamber and mixed with fuel injected into the combustion chamber. The air/fuel mixture combusts, which forces the pistons apart and thereby delivers mechanical energy to the crankshafts. When the pistons are near BC, products of combustion (exhaust) flow out of the exhaust port into and through an exhaust channel 78 of the engine.

For full hybrid capability, the opposed-piston engine system of FIG. 2 is also equipped to operate the engine 49 in one or more compressed-air modes. In this regard, the engine system has a bidirectional air transport channel for transporting compressed air through a compression-release port 81 that opens through the sidewall of the cylinder 50 at a position intermediate the intake and exhaust ports; preferably, but not necessarily, the port 81 is located in a portion of the cylinder between the TC locations of the pistons 60 and 62. The bidirectional air transport channel includes a compression-release valve 80 mounted in the compression release port 81, a transport channel 82 in fluid communication with the compression-release valve 80, and a storage valve 84 in fluid communication with the transport channel 82. A channel 85 transports compressed air between the storage valve 84 and a compressed air storage device 86. Alternatively, the storage valve may be mounted on the device 86. A channel 87 transports compressed air from the storage valve 84 to an intake valve assembly 90. Pressurized air is provided as an input to the intake valve assembly 90. The intake valve assembly 90 has an output that is transported to the engine intake ports via channel 88.

The valves 80, 84, and 90 are preferably high-speed, computer-controlled devices actuated by any one or more of mechanical, electrical, hydraulic, and pneumatic means. Control of these devices and of the fuel supply 76 is implemented by a programmed engine control unit (ECU)

100. The ECU 100 receives input data relative to the operating state of the engine (Engine OP State) and also receives sensed engine parameters including, without limitation, a crank angle (CA) indicative of engine speed and operating condition, Air Storage Pressure (P1) indicative of the air pressure in the air storage device 86, and cylinder Pressure (P2) indicative of the gas pressure in the cylinder, between the end surfaces of the pistons 60 and 62. In instances when the system of FIG. 2 provides motive power in a vehicle, the ECU 100 receives input data relative to the positions of Accelerator and Brake Pedals. The sensors by which the ECU 100 receives these parameter values are not shown in the figures; however, for purposes of this specification these and other sensors may comprise physical measurement devices and/or virtual systems. Using these and possibly other parameters, the ECU may be programmed to cause the valve setting configurations set out in Table I.

TABLE I

| Valve | Setting 1 | Setting 2 | Setting 3 |
|---|---|---|---|
| 80 | Shut | bore 52 to channel 82 | shut |
| 84 | Shut | air storage 86 to channel 82 | air storage 86 to channel 87 |
| 90 | Shut | shut | channel 87 to channel 88 |

Responsive to sensed parameter values and an indicated engine state, the hybrid opposed-piston engine system of FIG. 2 may be configured for open bi-directional fluid communication between the air storage device 86 and the cylinder bore 52 when the valves 80, 84, and 90 are set to setting 2. Depending on the difference in air storage and cylinder pressure, the bidirectional configuration supports either replenishment of stored compressed air by flow of compressed air from the cylinder 50 into the air storage device 86 or air-only operation of the engine 49 by movement of the pistons 60 and 62 in response to flow of stored compressed air from the air storage device 86 into the cylinder 50.

Responsive to sensed parameter values and an indicated engine state, the hybrid opposed-piston engine of FIG. 2 may be configured for supplementing combustion operation of the engine when the valves 80, 84, and 90 are set to setting 3, which enables flow of stored compressed air from the air storage device 86 into the charge air channel via the flow path 86, 85, 84, 90.

In some aspects, the engine system of FIG. 2 may further be equipped for compression-release engine braking by provision of a braking valve 92, also under control of the ECU 100. The braking valve 92 is connected to the transport channel 82 so as to release compressed air from the cylinder 50 for the purpose of engine braking. Preferably, but not necessarily, the compressed air released for engine braking is transported by the braking valve 92 to the exhaust channel 78. Accordingly, responsive to sensed parameter values and a sensed engine state, the ECU 100 may be programmed to configure the engine for engine braking by opening the compression-release valve 80, shutting the storage valve 84, and opening the braking valve 92 so that compressed air is released from the cylinder 50 via the flow path 82, 92.

As will be appreciated when FIG. 2 is considered, a full hybrid compressed-air/combustion capability of an opposed-piston engine system is realized by provision of a bidirectional air flow path between a compressed-air storage device and the bore of at least one ported cylinder.

A method of operating a wheeled vehicle such as an automobile, truck, or motorcycle, or a tracked vehicle such as a tank or snowmobile, equipped with a hybrid compressed-air/combustion opposed-piston engine system according to FIG. 2 (hereinafter, a "hybrid vehicle") may include a process for storing compressed air for later use and a process for operating the engine using compressed air alone. In either or both cases, the ECU 100 is programmed to execute processes in which air compressed between the pistons is stored in the air storage device and in which the opposed-piston engine is driven by compressed air, alone or to supplement combustion. In some aspects, the ECU 100 is further programmed to execute a process for braking the engine by release of compressed air.

Energy may be stored as compressed air in the air storage device 86 during a braking or deceleration event of the hybrid vehicle by way of a process in which:

1. The ECU 100 detects from brake and/or throttle pedal position signals that the vehicle is decelerating;

2. The ECU 100 shuts off fuel at one or more injectors 70 and lowers rail pressure;

3. When the cylinder pressure $P_2$ exceeds the air storage pressure $P_1$, the ECU 100 opens the decompression valve 80 and uses the storage valve 84 to connect the released air directly into the air storage device 86;

4. When the cylinder pressure $P_2$ drops below the air storage $P_1$, the ECU 100 closes the compression-release valve 80 to prevent loss of compressed air from the air storage device 86.

5. When the air storage device 86 is filled to its capacity, the ECU 100 again opens the compression release valve 80 but uses the braking valve 92 to output the released air.

6. Comment: //If the air intake pressure is controlled by a supercharger with a typical compression ratio of 16 to 17, it is possible to reach the air storage device capacity limit//

7. At the end of the braking or deceleration event, fuel injection is resumed. The storage valve 84 can be closed to prevent leakage from the air storage device 86.

On a subsequent launch event (acceleration, for example), compressed air stored in the device 86 may be used to convert this stored energy into mechanical energy for propelling the hybrid vehicle by way of a process in which:

1. The ECU 100 detects from brake and throttle pedal positions that the vehicle is accelerating;

2. When the ECU recognizes from the crank angle CA that the two pistons 60 and 62 are at their minimum volume positions, it ceases delivery of fuel to one or more injectors 70 and sets the storage valve 84 to directly connect the air storage device 86 to the compression-release valve 80;

3. The compression-release valve 80 is then opened, thereby releasing stored compressed air from the air storage device 86 and injecting the released compressed air into the cylinder bore 52 through the compression-release port 81 to force the pistons apart thereby providing positive torque at the output shaft of the engine;

4. When the cylinder pressure $P_2$ drops below the air storage pressure $P_1$, the ECU 100 closes the compression-release valve 80; and 5. When the ECU 100 determines based on cylinder and tank pressures $P_2$ and $P_1$ that the remaining energy is insufficient to provide the desired launch acceleration rate, it can then begin normal fueled operation.

In addition, if desired for a quicker launch transient, the storage valve 84 can be set to directly connect to the air storage tank through the normally closed intake valve 90, and the intake valve 90 can be opened, thereby supplementing the intake air with compressed air released from the air storage device 86.

Although principles of compressed-air/combustion hybridization of opposed-piston engines have been described with reference to presently preferred embodiments, it should be understood that various modifications can be made without departing from the spirit of the described principles. Accordingly, the scope of patent protection accorded to these principles is limited only by the following claims.

What is claimed is:

1. A method of operating a fuel-injected, opposed-piston engine having at least one ported cylinder, and a pair of pistons disposed in opposition in the cylinder, the method comprising:
    compressing air in the cylinder between the opposed pistons during an intake/compression stroke;
    releasing compressed air from the cylinder;
    storing the released compressed air;
    providing fuel and air to the cylinder;
    operating the engine in response to combustion of the fuel;
    stopping provision of fuel to the engine; and then,
    releasing the stored air; and,
    operating the engine in response to the released stored compressed air.

2. A method of operating a vehicle equipped with an opposed-piston engine, comprising:
    compressing air in a cylinder of the engine;
    injecting fuel into the compressed air in the cylinder to operate the engine;
    detecting deceleration of the vehicle;
    preventing fuel injection into the compressed air in the cylinder in response to the deceleration;
    opening a compression-release port located in an intermediate portion of the cylinder to release compressed air from the cylinder; and,
    storing the released compressed air in an air storage device.

3. The method of operating a vehicle according to claim 2, further including:
    detecting a pressure difference between compressed air in the cylinder and compressed air stored in the air storage device; and,
    closing the compression-release port in response to the pressure difference.

4. The method of operating a vehicle according to claim 3, further including: resuming fuel injection into the compressed air at the end of the deceleration.

5. The method of operating a vehicle according to claim 4, further including:
    detecting acceleration of the vehicle;
    preventing fuel injection into the compressed air in the cylinder in response to the acceleration;
    opening the compression-release port in response to the acceleration;
    releasing stored compressed air from the air storage device; and
    injecting the released compressed air into the cylinder bore through the opened compression-release port.

6. The method of operating a vehicle according to claim 4, further including braking the vehicle by releasing compressed air from the cylinder by opening the compression-release port.

7. The method of operating a vehicle according to claim 2, in which the opposed-piston engine is a fuel-injected, two-stroke opposed-piston engine.

* * * * *